Patented Feb. 20, 1934

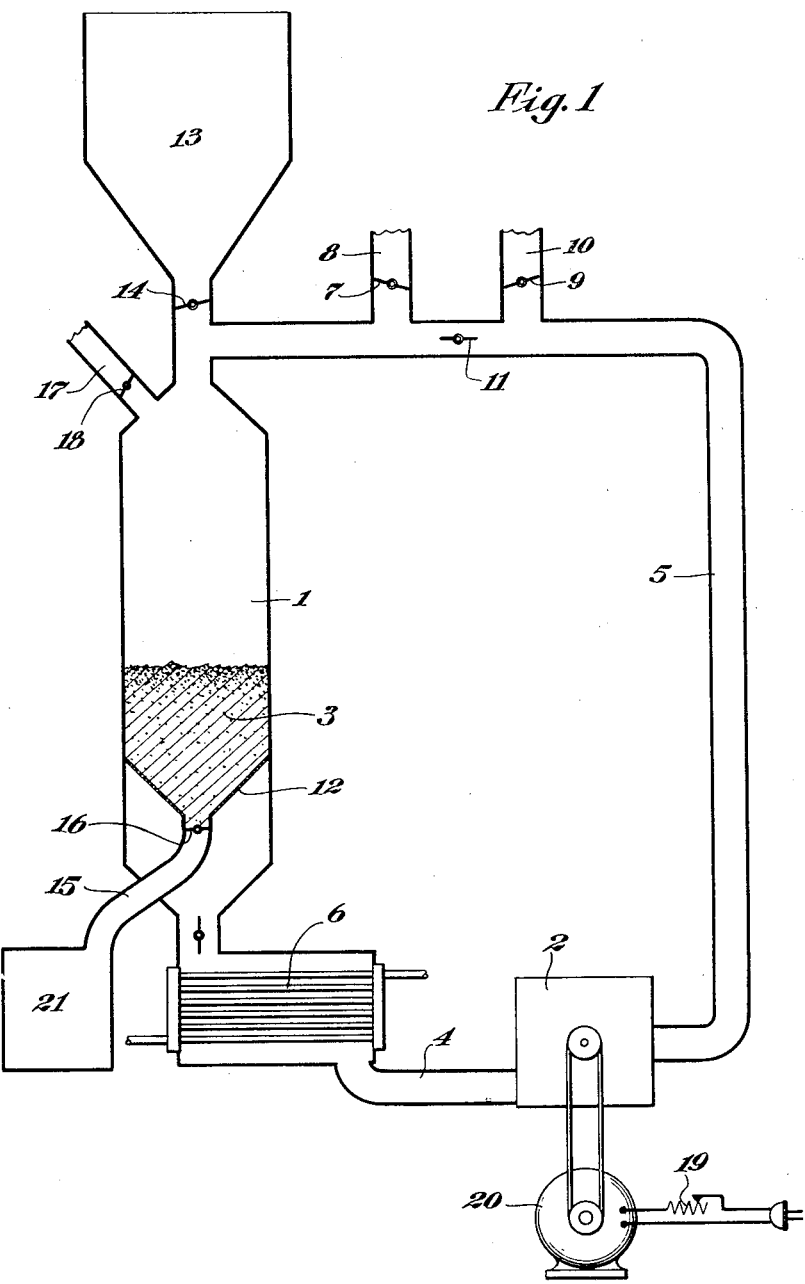

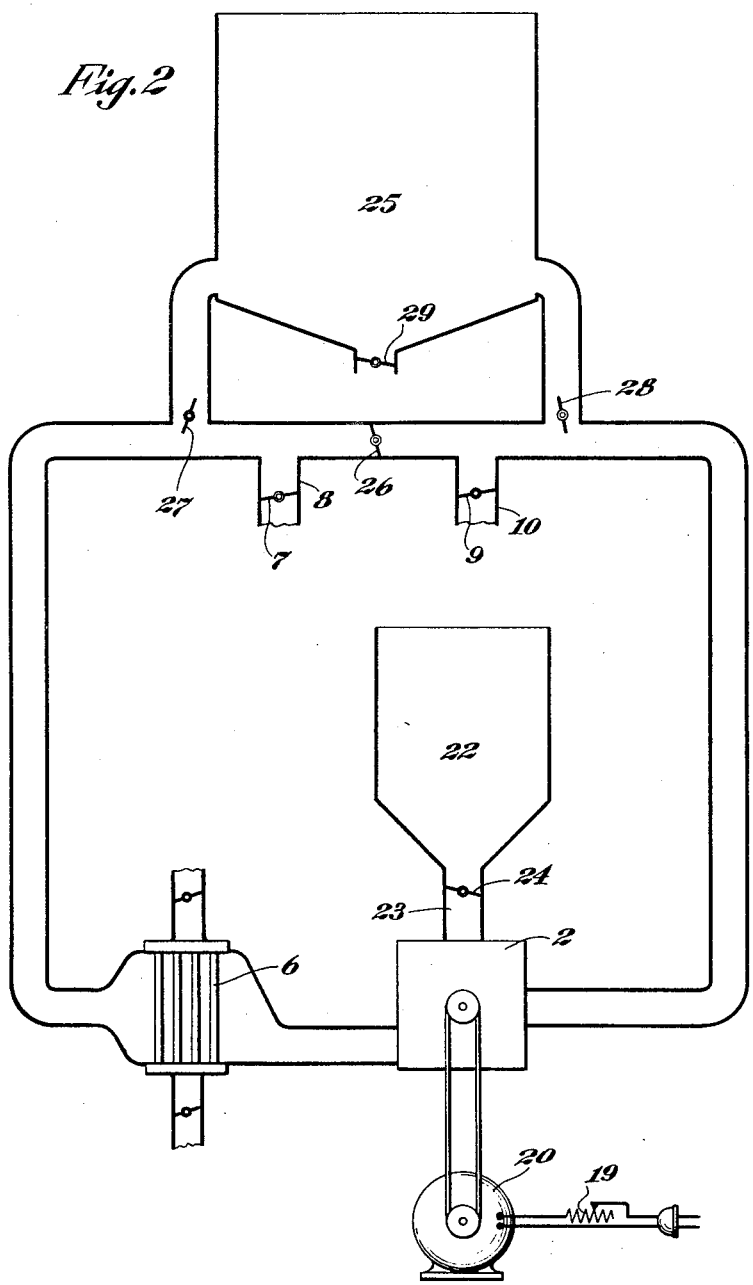

1,948,313

UNITED STATES PATENT OFFICE 1,948,313

PROCESS FOR REMOVING WATER OF CRYSTALLIZATION FROM CRYSTALS AND/OR SOLIDS

Wilfrid Van Nest Powelson, New York, N. Y.

Application March 29, 1929. Serial No. 351,132

3 Claims. (Cl. 23—50)

When a mass of crystals containing water of crystallization is heated sufficiently high water vapor may be driven off the crystals by the action of heat alone. Many crystals, when heated to their melting points, will melt or tend to melt in their water of crystallization if they are surrounded with an atmosphere laden with moisture supplied by the vaporization or volatilization of their water of crystallization.

In some processes, the object of which is to decompose crystals containing water of crystallization by the application of heat and recover therefrom valuable products, it has been found very difficult to make a satisfactory recovery from a mass of crystals which have been melted, and precautions are, therefore, taken to prevent the melting of the crystals in their water of crystallization before or during the process of applying a high heat for the purpose of decomposing them.

It has also been found very difficult to make a satisfactory recovery from a mass of crystals which exhibits a substantial swelling during the application of the high heat necessary to decompose them, and precautions are, therefore, taken to prevent such a swelling.

It has been found very difficult to make a satisfactory recovery from a mass of crystals which, during the application of the high heat necessary to decompose them, adhere to each other or to the walls of the container in which they may be placed, and precautions are, therefore, taken to prevent such adhesion.

It has been found in some cases that if a certain portion of the natural water of crystallization contained in a crystal is removed before heating to the higher heat necessary to decompose it, there will be no tendency for it to melt in its water of crystallization, or to swell or to adhere.

I have made an invention, the object of which is to provide a practical, efficient and economical process for the removal of water of crystallization from crystals containing it.

This invention has useful applications. For example, if applied to potash alum in a proper manner it will be found to have satisfied the precautions necessary to be taken to prevent melting, swelling and adhesion of crystals or solid particles of potash alum during the high heat treatment to decompose them into valuable products.

The invention is illustrated in the drawings herewith, in which Fig. 1 illustrates diagrammatically the apparatus used in carrying out my invention in one manner while Fig. 2 shows diagrammatically apparatus for carrying it out in another way.

In the present state of the art it is considered a difficult matter to remove from some salts containing water of crystallization sufficient of said water to prevent swelling and/or melting and/or adhesion during the application of the high heat necessary to decompose them. Various processes have been proposed to accomplish this desirable result, but from the point of view of their commercial application to large masses of materials they leave much to be desired.

Some processes heretofore proposed seem to place their main, if not their entire, reliance for the accomplishment of their object upon the application of heat in order to vaporize, or volatilize, water of crystallization from crystals or solids containing it; and to remove from the intersticial space or spaces of a mass of said crystals or solids when so volatilizing or vaporizing water of crystallization the intersticial vapor of water. The term "intersticial vapor of water" when used in this application refers to vapor of water the result of volatilizing or vaporizing water of crystallization from crystals and/or solids containing it assembled in a mass, which upon being formed occupies in whole or in part the space or spaces between the crystals and/or solids constituting the mass. The term "intersticial space or spaces" when used in this application refers to the space or spaces between crystals and/or solids constituting a mass, irrespective of the tightness or looseness with which they may be assembled and irrespective of whether they are assembled in a compact mass having voids substantially equal to the aggregate volume of the solids constituting the mass, or whether they are widely separated as when a mass of crystals and/or solids is being transported in a state of suspension or partial suspension by a gas to which a substantial velocity has been imparted.

It is known that some of these processes are very difficult to operate except on the smallest scale because unless the heating is very carefully controlled at a temperature substantially below their melting point, crystals will melt in whole or in part, with the result that their value for subsequent high heat treatment is largely if not totally destroyed.

Thus the commercial application of such a process may become very expensive. The time required in the application of a process of this kind, even though the temperature is so accurately controlled as to give a successful result, is inherently very long and wasteful of heat because the precautions necessary to be taken to prevent melting of the crystals seem to require that the heating be maintained for a long time at a temperature substantially below the melting point of the crystal.

The reason for this seems to be that if a crystal in a mass of crystals, be heated to a temperature reaching its melting point, surrounded by an atmosphere laden with vapor of water supplied by the volatilization and/or vaporization of water of crystallization from the general mass, it will melt in its own water of crystallization.

The central idea underlying my invention is that I employ means to prevent the crystals in the mass from being surrounded by an atmosphere laden with vapor of water while water of crystallization is being removed from the mass. I cause the crystals of the mass to be surrounded or substantially surrounded while water of crystallization is being removed from the mass by an atmosphere which has the power to mix with and absorb vapor of water and which has an affinity for vapor of water in sufficient degree so that it can seize and hold vapor of water being volatilized or vaporized from the crystals and prevent it from combining or recombining with crystals in the general mass in an amount sufficient to melt them in their water of crystallization.

This affinity of the said atmosphere for vapor of water I will call its avidity for moisture, and the degree of affinity above described I will call a substantial avidity for moisture. To put it in other words, by the term "gas having a substantial avidity for moisture" I mean a gas the moisture content of which is substantially less than the moisture which it can contain in gaseous form at its then temperature, and substantially less than the amount of moisture which it would contain as a gas if exposed at its then temperature to a water surface.

The essence of my invention is to fill or substantially fill the intersticial space or spaces of a mass of crystals and/or solids while under treatment for the removal of water of crystallization with an atmosphere, preferably hot and in a state of motion, having a substantial avidity for moisture. I find that by so doing I can give to the said atmosphere while in contact with a mass of crystals containing all or substantially all of their natural water of crystallization a temperature substantially higher than the melting point of the crystals without causing them to melt in their water of crystallization.

If vapor of water produced by the volatilization and/or vaporization of water of crystallization can be seized and held at the moment it reaches or leaves the surface of a crystal by a gas or a mixture of gases having a substantial avidity for moisture, the probability of this vapor combining with the same or with other crystals in the general mass is greatly reduced if not entirely eliminated.

There are crystals containing in their natural state water of crystallization which have a low melting point, but it is well known that if from these crystals there is removed, without melting them, a large part of their natural water of crystallization, they may later be heated to their decomposition temperatures without causing them to melt, swell or to adhere. Potash alum is a crystal of this character. The danger of melting in its water of crystallization a crystal from which vapor of water is being removed or expelled by heat, and the danger of melting in their water of crystallization other crystals of the general mass with which said vapor of water may come in contact is greatly reduced if not entirely eliminated by causing a gas having a substantial avidity for moisture to pass over or to be in contact with the surface of every crystal of the mass at the instant that vapor of water is being removed or expelled therefrom.

By the application of my process I cause a gas having a substantial avidity for moisture to pass over or to be in contact with all or substantially all of the crystals or solids of a mass at the instant that vapor of water is being removed or expelled from the crystals or solids thereof. Thus the proper application of my process causes the removal of water of crystallization from a volatilizating or vaporizing mass of crystals or solids containing water of crystallization, with a minimum danger that crystals or solids will melt in their water of crystallization, and permits the more rapid removal, of a substantial part, if not all of the water of crystallization contained.

I preferably use a gas having a substantial avidity for moisture which, while passing over or in contact with a crystal containing water of crystallization, has a temperature higher than the melting point of said crystal. I find that this higher temperature cuts down substantially the time required to remove water of crystallization.

I also prefer, in order to cut down on the expenditure of heat units required to remove water of crystallization and in order to reduce the cost of the operating to cause a volume of the said hot gas to be brought in contact with volatilizing or vaporizing crystals a plurality of times until its avidity or affinity for moisture has been reduced to that point where it is no longer an efficient agent for seizing and holding vapor of water which may leave, be drawn out of, or be expelled from said crystals or solids.

I accomplish this purpose by causing the said gas to pass more than once through the intersticial space or spaces of a mass of said crystals and/or solids where the particular application of my invention requires a volume of gas having an avidity for moisture to be passed under pressure through a closely confined and/or contained mass of crystals and/or solids containing water of crystallization. When so passing said gas it is desirable to so pass it that there may be not only a very general distribution of gas throughout the whole mass of crystals, but a sufficient velocity of gas in all parts of the mass so that there may be no local or general moisture saturation of the gas due to its mixing either locally or generally with a larger volume of vapor of water than it can efficiently seize and hold as against the attraction of particles in the said mass for vapor of water.

A modified form of apparatus for carrying out my invention is based on the fact that the danger of a local moisture saturation of gas will be lessened, if not entirely eliminated, if a mixture of crystals and/or solids containing water of crystallization and a hot gas having a substantial avidity for moisture is caused to be moved or forced through a conduit at a velocity that will cause the solid particles to be whirled, carried along and transported by the gas in intimate contact with it. The percentage of the water of crystallization removed from said crystals and/or particles while being transported by said gas will vary, other things being equal, with the time occupied by the said transportation. It is important that the time occupied by the said transportation be subject to control. Therefore, in order to insure a sufficiently long time of transportation and to control the time of transportation I prefer to cause said mixture of solid particles and gas to circulate in a closed conduit one end of which is attached to the suction side of the means to impart velocity to the gas and the other end to the discharge side; so that the circulation and intimate mixture of gas and solids may be continued as long as desired. Whether a hot gas having a substantial avidity for moisture is used to transport through a conduit, in a state of suspension or partial suspension, solids containing water of crystallization, or whether such a gas is forced through the intersticial space or spaces of a mass of such solids substantially at rest within a container, for the purpose of removing from said solids water of crystallization, the same principle is involved in that the solids are, in both cases, surrounded or substantially surrounded with an atmosphere having a substantial avidity for moisture and there is, in both cases, a relative movement as between the gas and the solids; and in both cases the gas moves through the intersticial space or spaces of the mass of solids. In both cases means may be employed to control the time during which gas may be made to pass through said intersticial space or spaces and in both cases means may be employed to control, during the operation, the temperature of the gas and/or its avidity for moisture.

It is also important that means should be provided so that, when a sufficient amount of water of crystallization has been separated from the solids, the solids may be separately removed from the said gas having an avidity for moisture. When the particular application of my invention requires a gas having a substantial avidity for moisture to be forced through the intersticial space or spaces of a mass of crystals or solids held in a container, I use means to cut off the supply of said gas to said container and means to remove from said container the de-hydrated or partially de-hydrated crystals or solids.

When the particular application of my invention requires a mass of crystals and/or particles containing water of crystallization to be transported through a circulation conduit, in a state of suspension or partial suspension, by a gas in motion having a substantial avidity for moisture I use means to cause the de-hydrated or partially de-hydrated solids to separate from the said gas. I prefer to use the attraction of gravity as the agency to cause said separation and I employ this agent in a practical manner by fitting said conduit with a by-pass and equipping this by-pass with a settling chamber having a cross-section substantially larger than the cross-section of said conduit so that when said gas is caused to pass through said by-pass its velocity is so reduced in the settling chamber that it can not continue to transport the solids and they fall by the attraction of gravity to the floor of said chamber from which they may be separately removed from said gas. The gas passes on through the settling chamber and reenters the main circulating conduit without carrying with it the said solids.

Whether a volume of gas is forced through a closely confined mass of particles or solids and re-circulated through said mass, or whether a mixture of gas and particles, in a state of suspension or partial suspension therein, is caused to move through a conduit, I prefer to use means to regulate and control the avidity for moisture of the gas while it is in circulation and/or motion. The avidity for moisture of some gases may be regulated and controlled by regulating and controlling their temperature. The avidity of some may be increased by increasing their temperature.

The avidity of a gas for moisture is lessened by mixing it with vapor of water. Therefore, if a hot volume of gas having initially a substantial avidity for moisture be circulated and brought in contact a plurality of times with particles or solids containing water of crystallization without means to regulate and control its avidity for moisture, said avidity might steadily decrease.

Assuming that the volume of gas used is one whose avidity for moisture may be increased by raising its temperature, then if while being so circulated and brought in contact a plurality of times its temperature is sufficiently increased, its avidity for moisture may be kept constant or even increased, even though its content of water vapor has been increased. The tendency of some crystals to melt in their water of crystallization when exposed to heat decreases after a part of the water of crystallization is removed from them until the tendency to melt at any temperature whatsoever ceases when a sufficient percentage has been removed. Advantage may be taken of this fact to increase the temperature of the said circulating gas as the percentage of water of crystallization in the crystals decreases, thus increasing the rate of volatilization of water of crystallization and the ability of the gas to seize and hold vapor of water. The time required to remove a desired percentage of the water of crystallization may be substantially reduced without causing the crystals to melt if there is a substantial steady increase in the temperature of the gas during the operation.

Apparatus to operate the preferred form of my invention, that is, the form in which the crystals or solids from which it is desired to remove water of crystallization are in a mass at rest in, or confined within a container, is shown in Fig. 1. It consists essentially of a closed endless conduit comprising a container for the crystals or solids and a blower. The container is shown at 1 and the blower at 2. The crystals or solids in container 1 are indicated by the reference numeral 3. A duct 4 leads from the blower to the container and a duct 5 from the container back to the blower. The whole conduit is filled with a gas which has a substantial avidity for moisture and this is caused to circulate through the conduit by the blower.

Preferably, air is used as the gas having a substantial avidity for moisture, and in order to give it the desired temperature, heating means are inserted in the duct 4. These heating means preferably consist of a nest of pipes 6 through which a heating medium is caused to flow, the air in the conduit circulating around the outside of said pipes. In order to remove the particular body of air circulating in the conduit and to introduce a new volume of air, three valves are provided. One of these, 7, is located in the pipe 8 leading outwardly from the duct 5, the second, 9, is located in the pipe 10 likewise leading outward from the duct 5, and the third, 11, is located in the duct 5 at a point between the pipes 8 and 10. When it is desired to remove the volume of air in the conduit, the valve 11 is closed and valves 7 and 9 are opened. The blower 2 will then act to expel the air which is in the conduit through pipe 8 and to introduce a fresh volume of air through the pipe 10. After this has been accomplished, the valves are again put into the positions indicated in the figure. In the container 1 the crystals or solids rest upon the perforated bottom 12. The air or other gases with a substantial avidity for moisture is circulated through the conduit by the blower 2, its temperature being raised to the desired point by the heating pipes 6 and is circulated in the conduit for the desired length of time, passing through the openings in the bottom 12 through the mass of crystals where it absorbs water of crystallization, and so on back to the blower. It is discharged from the conduit when it has absorbed so much moisture that it no longer has the substantial avidity for moisture required for the process, and a new charge of air is then taken in.

The crystals are introduced into the container 1 from the hopper 13 through the valve 14, the latter being closed after the proper amount of crystals has been introduced.

When it is desired to remove the mass of crystals or solids from which the water of crystallization has been removed to the desired extent, this is done through the passage 15 opening from the perforated bottom 12, a valve 16 being opened for this purpose. The pipe 15 discharges the crystals into the container 21. At the same time I preferably admit air under pressure through the pipe 17 by opening the valve 18.

In order to control the pressure and velocity of the gas in the conduit, the speed of the blower 2 can be regulated by adjusting the rheostat 19 of the motor 20 which drives the blower 2.

In Fig. 2 is illustrated a form of apparatus for carrying out the modification spoken of above, of my process. In this modification the crystals or solids containing water of crystallization are not at rest in the container but are carried along by the current of air or other gas used to take up the water of crystallization. In this instance too, there is a closed conduit through which the air is circulated by a blower 2. The conduit also includes heating means which are shown in the form of heating pipes 6 through which a heating medium is circulated. The crystals are fed into the current of gas from the hopper 22 through the pipe 23, the valve 24 being opened by the requisite amount for this purpose. The air carrying the crystals is circulated through the conduit and is kept in such circulation until the water of crystallization has been removed to the desired extent. After this has occurred, valve 26 in the conduit is closed and the gas carrying the solids with it is by-passed into the chamber 25 by opening valves 27 and 28. The chamber 25 is relatively very large so that the velocity of the gas becomes relatively very small and the solids settle out of the air to the bottom of the chamber whence they are removed through the valve 29. A fresh charge of air is taken into the conduit by opening valves 7 and 9 in pipes 8 and 10 and closing valve 26.

The speed of the motor 20 and, therefore, the velocity of the gas flow around the circuit, can be regulated by means of the rheostat 19.

I claim:—

1. A process for the removal of water of crystallization from a mass of solids having intersticial spaces and containing particles of a salt containing water of crystallization which consists of giving to said particles a temperature sufficiently high to cause them to liberate water of crystallization; and of at the same time causing said particles to be transported by causing them to become mixed with a gas having a greater avidity for moisture than that possessed by said particles and a velocity sufficiently high to give motion to said particles in the general direction in which said gas is moving; and of regulating and controlling the temperature and avidity for moisture of said gas while in a state of motion, to keep the particles at all times during the process from dissolving in the water liberated by them in changing from the crystalline form.

2. The process according to claim 1, the temperature regulation and control being effected by adding heat to the gas as its water content increases.

3. The process according to claim 1, the temperature regulation and control being effected by repeatedly passing the gas over the same heated surfaces while its water content is increasing.

WILFRID VAN NEST POWELSON.